Dec. 16, 1969  W. B. MUNDEN  3,483,758
REMOTE SPEED INDICATOR
Filed Dec. 21, 1967
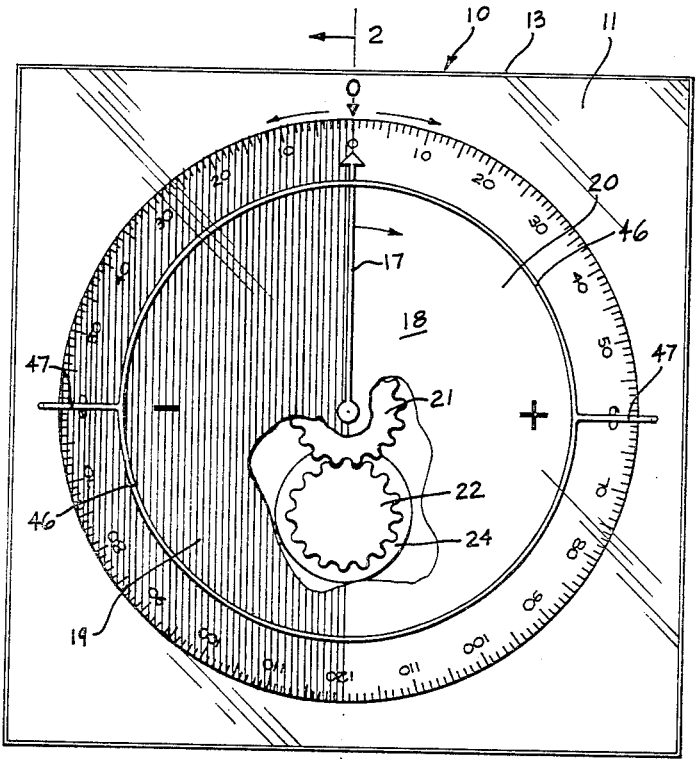
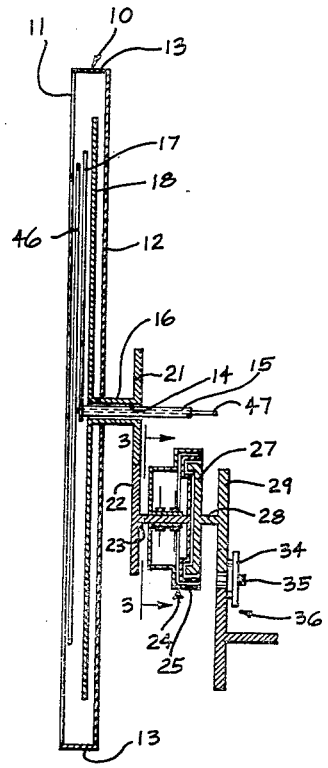
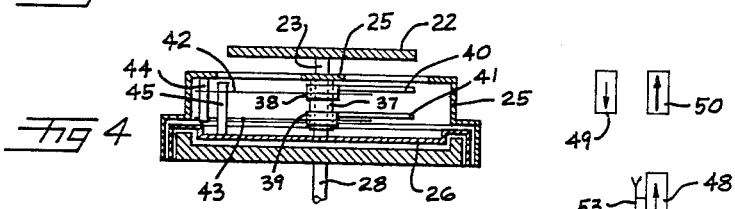
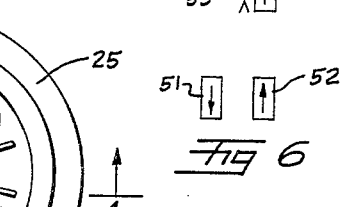
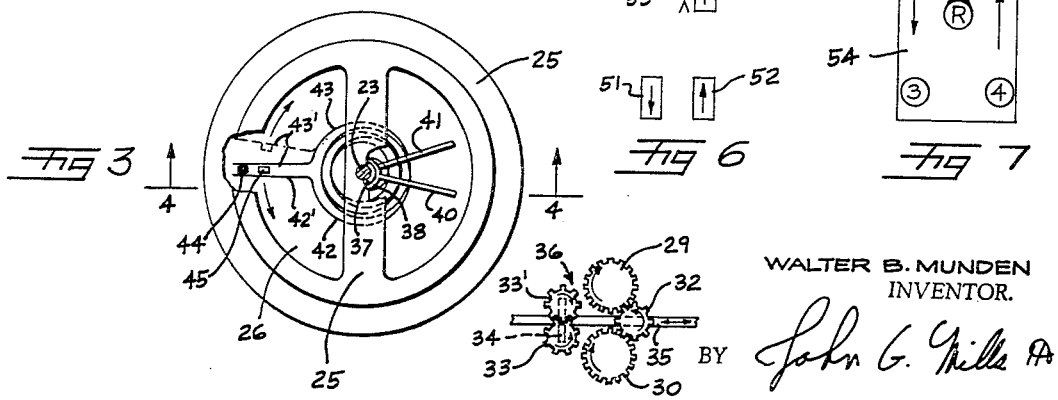
WALTER B. MUNDEN
INVENTOR.
BY *John G. Mills*
ATTORNEY.

United States Patent Office 3,483,758
Patented Dec. 16, 1969

3,483,758
REMOTE SPEED INDICATOR
Walter B. Munden, Charlotte, N.C., assignor of fifty percent to Luther N. Packer, Fayetteville, N.C.
Filed Dec. 21, 1967, Ser. No. 692,480
Int. Cl. G01p 3/00, 3/04
U.S. Cl. 73—491                         6 Claims

ABSTRACT OF THE DISCLOSURE

The invention is an indicator which, through mechanical means computer, from the relative speed of two vehicles sensed by an electronic device carried by one of the vehicles and the speed of the vehicle carrying the electronic device, the ground speed of the other vehicle.

---

This invention relates to speed indicating devices and more particularly to mobile, remote positioned speed indicators.

During the last few years, various types of mechanical, electro-mechanical and electronic speed clocking devices have been developed in an effort to give police and state troopers ever increasingly accurate means for determining the speed of suspected law breaking vehicles. One of the more widely used types of instruments today is what is commonly known as "radar." These instruments operate on the principle of timing electronic pulses which are bounced off the vehicle being clocked so that an indication of the rate of change between the clocking vehicle and the clocked vehicle will be indicated on a calibrated dial.

These radar devices operate completely satisfactorily when they are stationary since the rate of closing and the ground speed of the vehicle being clocked are the same. When, however, the radar unit is mobile, the speed of the clocking vehicle must be taken into consideration in determining the actual ground speed of the clocked vehicle. In many states the courts have ruled that a patrolman cannot testify as to the speed of the clocked vehicle if the radar unit is mobile at the time of such clocking. The officers can only testify as to the speed at which the clocking vehicle was traveling and as to the rate of closing with the clocked vehicle. The jury must then do the computations and draw their own conclusions as to actual speed. This is a haphazard and unwieldy method of convicting speeders at best.

To overcome this problem, electronic computers have been devised to take into consideration the speed of the clocking vehicle and the closing speed with the clocked vehicle in reading out the ground speed of such clocked vehicle. These systems, however, are complicated to construct and repair and are expensive to purchase and maintain. The advantage of these computing units over the radar presently being used does not ordinarily justify the additional expense involved, particularly since most purchasing agencies are either states or larger cities which need great numbers of the systems.

The present invention has been developed after much research and study of the above mentioned problems and is designed to give accurate, single readings of the actual ground speed of the vehicle being clocked from a remote mobile clocking unit. It is inexpensive to manufacture and maintain and utilizes the same type of radar units presently in use in great numbers throughout the country. Through mechanical means, applicant's invention provides fool-proof means for police officers and others to obtain a single indication of the speed of a vehicle being clocked without having to compute such speed manually. It additionally makes it possible to selectively obtain the speed of vehicles regardless of the direction in which they are traveling and also allows the transition in switching from the clocking of a vehicle to another to be made almost instantaneously.

It is an object, therefore, of the present invention to provide a mechanical means for combining the speed indicators of an electronic rate of close indicator and the clocking vehicle's speed indicator to accurately indicate the actual ground speed of the vehicle being checked.

Another object of the present invention is to provide a simple, inexpensive mechanical means for combining the speed of a clocking vehicle and the closing speed with a clocked vehicle into a single indication regardless of whether such clocked vehicle is approaching from the front or rear, or whether such clocked vehicle is traveling in the same direction or the opposite direction from the clocking vehicle.

A further object of the present invention is to provide a speed determining device which includes a speedometer that will operate in either direction thereby allowing clocking of vehicles both traveling in the same direction as and in the opposite direction from the device carrying vehicle.

Another object of the present invention is to provide a means for instantaneously switching from the clocking of vehicles traveling in the same direction as the clocking unit to vehicles traveling in the opposite direction.

Other objects and advantages of the present invention will become apparent and obvious from a study of the following description and the accompanying drawings which are merely illustrative of the present invention.

In the drawings:
FIG. 1 is a front elevational view of a preferred embodiment of the present invention;
FIG. 2 is a section taken through lines 2—2 of FIG. 1;
FIG. 3 is a plan view of the reversible speedometer element of the present invention;
FIG. 4 is a section taken through lines 4—4 of FIG. 3;
FIG. 5 is a front elevational view of the reversing gear element;
FIG. 6 shows the various directions and positions of clocked and clocking vehicles; and
FIG. 7 is a schematic of a control panel for operating the indicator.

With further reference to the drawings, a transparent front portion 11 and a rear portion 12 are disposed in parallel planes and are joined by wall portion 13 to form the indicator housing referred to generally at 10.

A shaft 15 is provided which is secured at one end to an electronic rate-of-close calculating means (not shown) such as the commercially available radar type units used to enforce highway speed regulations. The other end of shaft 15 is disposed through, and is rotatively supported by bearing surface 14. This bearing surface is formed as a hollow cylindrical opening passing longitudinally through the speedometer indicator support shaft 16 which is in turn rotatively mounted through rear portion 12 of housing 10, particularly as disclosed in FIG. 2.

The end of shaft 15 disposed within housing 10 has fixedly secured thereto a radar speed indicator needle 17. Thus it can readily be seen that as the electronic unit rotates shaft 15 in response to a differential in the rate of closing between two vehicles, needle 17 will rotate to visually indicate the differential.

Fixedly secured to the end of speedometer indicator support shaft 16 which is disposed interiorly of housing 10 is speed indicator card 18. There is a scale around the periphery of this card to coincide with both the electronic rate of closing indications and the vehicle speedometer indication as will be hereinafter described. Additionally the purpose of the shaded half 19 and the white half 20 of this card will hereinafter be dealt with.

Integrally formed onto the end of shaft 16 opposite speed indicator card 18 is support shaft gear 21. A second gear 22 is provided which has the same number of teeth and is of the same diameter as gear 21. These two gears are adapted to constantly mesh in operative relation to each other. This latter gear 22 is fixedly mounted on speedometer shaft 23.

A speedometer indicated generally at 24 is provided which is capable of giving indications in either direction from a preset zero stop. This speedometer is formed basically in the usual manner and includes a field plate-housing 25, a speed cup 26 and a magnet 27. The speedometer shaft 23 is fixedly secured to speed cup 26 and speedometer drive shaft 28 is fixedly secured to magnet 27.

To allow operation of the speedometer in reversing directions, as will hereinafter be described, a reverse gearing means has been provided. This means is composed of two identically sized and toothed gears 29 and 30 being fixedly mounted respectively on the speedometer drive shaft 28 and a speedometer cable shaft 31. This last mentioned shaft is operatively driven in the usual manner by the transmission (not shown) of the vehicle within which the indicator of the present invention is mounted. Thus it can be readily seen that gear 30 is a drive gear. To transmit power from gear 20 to gear 29, there is provided a slide bar 35 upon which is mounted in spaced relation gear 32 and a pair of constantly meshed gears 33 and 33'. This last mentioned pair of gears is rotatively supported by bracket 34 which, of course, is fixedly secured to bar 35.

If cable shaft 31 normally rotates in a clockwise direction and it is wished to rotate gear 29 in the same direction, slide bar 35 is moved to the left as oriented in FIG. 5 to engage gear 32 with gears 29 and 30. Since gears 29 and 30 are both of the same size and number of teeth, gear 30 will drive gear 29, through gear 32, in the same direction.

When it is desired, as will hereinafter become obvious, to reverse the direction of travel of gear 29 and thus of the speedometer and the speed indicator card, slide bar 35 is moved to the right as oriented in FIG. 5 thus disengaging gear 32 and engaging gear 33 with gear 30 and gear 33' with gear 29. As gear 30 continues to rotate in a clockwise direction, gear 33 rotates in a counterclockwise direction, gear 33' is driven in a clockwise direction and gear 29 is reversed and now moved in a counterclockwise direction. Of course, the identical rotative movement imparted by gear 30 is received by gear 29 since the meshed gears 33 and 33' are of identical size and teeth as are the two larger gears.

Although the reversing element indicated generally at 36 is placed in the power train before the speedometer 24 thus requiring a reversing speedometer, a standard uni-directional speedometer could be used by driving the speedometer drive shaft with the speedometer cable shaft 31 and placing the reversing element between the gears 21 and 22. Care, of course, must be taken in such an arrangement that no motion is lost between the drive and driven gears since such loss would cause the speed indicating card 20 to register inaccurately.

With specific reference to the reversible speedometer element 24 of the present invention, the standard field plate-housing 25, speed cup 26 and magnet 27 are used along with the speedometer drive shaft 28 which is fixed to the magnet and the speedometer shaft 23 which is fixed to the speed cup. To allow reversing or multidirection operation while at the same time providing a zeroing stop to cause the indicator to always return to the same predetermined position upon ceasation of operation, the housing 25 is extended downwardly about shaft 23 to form a fixed sleeve 37 through which such shaft rotates. As will be noted in FIG. 4, there is a definite clearance left between this sleeve and the speed cup 26.

A pair of adjusting sleeves 38 and 39 are grippingly mounted in spaced relation to each other on sleeve 37. Adjusting arms 40 and 41 are fixedly secured respectively to adjusting sleeves 38 and 39. Hair springs 42 and 43 for returning speed cup 26 to a predetermined or zero position at the termination of operation and for maintaining tension against the rotation of such speed cup caused by magnet 27 are provided. These springs are secured respectively to adjusting sleeves 38 and 39. The upper hair spring 42 as oriented in FIG. 3 is coiled from adjusting sleeve 38 outwardly in a clockwise direction and terminates in an elongated portion 42'. Lower hair spring 43 is coiled outwardly from adjusting sleeve 39 in a counterclockwise direction and terminates in a similar elongated portion 43'. These straightened or elongated portions are adapted to rest one on either side of depending housing stop 44 and upwardly projecting speed cup stop 45 when the speedometer is not operating.

Thus it can be seen that adjusting arms 40 or 41 may be moved to overcome the gripping pressure of the adjusting sleeves 38 or 39 to housing sleeve 37 so as to adjust the tension on either of the extended portions of the two hair springs when they are at rest on each side of the two aligned stops 44 and 45.

When the magnet 27 is rotated by shaft 28 in, as for example, a clockwise direction, it will cause speed cup 26 to begin to move in such clockwise direction as is usual in uni-directional speedometers. As the speed cup moves, hair springs 43 will be displaced as indicated by the dotted line in FIG. 3 due to the movement of stop 45 which is fixedly secured to said speed cup. Thus a return pressure is constantly maintained on the cup 26 by spring 43 although it is allowed to move as it is pulled by the rotating magnet 27.

When the rotation of speedometer drive shaft 28 is stopped or slowed to a very low number of r.p.m.'s, spring 43 will overcome any magnetic attraction and move the speed cup 26 in a counterclockwise direction as oriented in FIG. 3 until said spring 43 comes into blocking contact with housing stop 44. Since the pressure of spring 42 is in the opposite direction, the speed cup stop 45 will be held between the two opposing springs bearing on either side of fixed housing stop 44.

Should drive shaft 28 now be rotated in a counterclockwise direction, it will attract and move speed cup 26 proportionally in the same direction but this time against the resistance of spring 42.

The advantage of the reversible speedometer element of the present invention is that it allows travel of the speed cup in either direction while maintaining tensioning toward the fixed housing stop. It also has the advantage of not requiring the speed cup to overcome more than one hair spring at the time regardless of which direction such cup is being attracted. Additionally, the tension on both springs 42 and 43 can be adjusted so that the situation of too much or too little tension may be corrected.

To hold or lock the radar speed indicator needle and the vehicle's speed indicator card relative to each other to allow time for more accurate reading and similar purposes, a circular hold ring 46 is disposed adjacent the interior of transparent front portion 11. A pair of arms 47 are fixedly secured on either side of said ring and outwardly project therefrom beyond the periphery of speed indicator card 18. Each of the arms 47 then is disposed rearwardly so they pass through the rear portion 12 of housing 10 to any suitable source of push-pull power such as a solenoid (not shown). Thus it can be seen that if it is desired to clampingly hold card 18 and needle 17 in fixed relation to each other and the housing 10, all that needs to be done is to pull each of the arms 47 rearwardly so that hold ring 46 is pressed against such needle and card. To release these two items, arms 47 and ring 46 are simply moved forward toward front portion 11.

In actual operation of the remote speed indicator of the present invention, the speed differential calculated by the electronic device (not shown) is fed through shaft 15 to needle 17. This will move the needle to the right in a clockwise direction from zero to indicate the rate of closing or separating between the two vehicles in miles per hour. Since the speedometer indicator card 18 is capable of moving either to the left or to the right, when the operator of the system in the clocking vehicle 48 wishes to clock vehicle 49 of FIG. 6, he pushes button #1 of control panel 54 shown schematically in FIG. 7. This activates the front portion of transmitter and receiver element 53 as well as a push-pull solenoid (not shown) to engage one side of the reversing element 36 to drive speedometer 24 in a direction which moves speedometer card 18 to the right in a clockwise direction, a distance equivalent to the forward motion of the clocking vehicle 48 is moving in the direction of the arrow as indicated in FIG. 6 at a speed of 40 miles per hour, the speedometer card 18 will rotate in a clockwise direction until 40 is adjacent the zero mark at the top of the housing as oriented in FIG. 1. It should be noted that this reading is in the red or negative portion of the indicator card. Since the radar needle 17 always indicates only the rate of closing and only moves in a clockwise direction, if the rate of closing is 90 miles per hour, it will move to the 90 indicia as oriented in FIG. 1. The card has already moved to the 40 in the negative or subtracting side so needle 17 will read 50 miles miles per hour for the actual ground speed of the approaching clocked vehicle 49.

In like manner if a vehicle has passed the clocking vehicle 48 and is traveling in the opposite direction therefrom as is clocked vehicle 51 of FIG. 6, button #3 of the control panel should be pushed which will continue maintaining the reversing element in a direction to cause the speedometer card to move and be read in the negative area while deactivating the front portion and activating the rear portion of transmitter-receiver element 53.

On the other hand if a car such as indicated at 50 is traveling in the same direction as the clocking vehicle 48 and in front thereof, button #2 would be pushed on the control panel 54 which would switch on the front portion and switch off the rear portion of element 53 as well as reverse the reversing element 36 causing the speedometer to move in the opposite direction and thus drive the speed card to the left so that such card reads in the positive or plus area at the zero mark. The reason for this is obvious since the rate of close must be added to the clocking vehicle's speed in order to determine the ground speed of such clocked vehicle. As an example, if the rate of close is 20 miles per hour and the clocking vehicle is traveling in the same direction at 60 miles per hour, the 60 would read at the zero at the top of FIG. 1, and the radar needle would move 20 indicia to the right to point at 80 which is the ground speed of the clocked vehicle. If, of course, the clocking vehicle had been operating at a greater speed than the clocked vehicle in this example, the negative scale would be used by pushing button #1 of the control panel to subtract in front.

As was the case with the clocking of the vehicle indicated at 50, the clocking of vehicle indicated at 52 approaching from the rear and traveling in the same direction as vehicle 48 would be accomplished by pushing button #4 of the control panel which would activate the rear radar only and cause the speed indicator card 18 to rotate into the positive area thereby adding the differential between the clocked vehicle 52 and the clocking vehicle 48.

The transmitting and receiving portion 53 of the electronic speed differential calculator or radar is so constructed that it transmits and receives selectively electronic pulses both in front and behind the clocking vehicle as schematically indicated in FIG. 6. It should be obvious from the above, however, that at no time will portion or element 53 be operated in both directions simultaneously. Additionally, if multi-lane roads are under surveillance, it may become necessary to have two or more front and two or more rear transmitting and receiving elements 53 with appropriate controls (not shown) on panel 54 to accurately and adequately check all traffic.

If the clocking vehicle is not moving, the speedometer will automatically rotate the speed indicator card to zero and any vehicle being clocked, regardless of from which direction, will be read directly on such card since needle 17 moves in the positive area to indicate the speed differential which is the actual ground speed.

As heretofore mentioned, if a multi-directional speedometer is not used and the standard uni-directional speedometer is, the reversing element as hereinabove described between the cable shaft 31 and the speedometer drive shaft 28 would be installed between gears 21 and 22 thereby accomplishing the same reversing of the speed indicator card 18 in the sequences described for the clocked vehicles 49, 50, 51 and 52.

Whenever the operator of the indicator system of the present invention has a reading he wishes to preserve, he activates the holding ring 46 by any convenient method such as pressing the control marked "R" of the control panel 54 which will activate a solenoid (not shown) to move arm 47 rearwardly thus catching needle 17 and pressing it against dial 18 and holding both of these elements against movement relative to housing 10. When it is desired to release the hold ring 46, control "R" may be again depressed which will activate means (not shown) to move arm 47 toward front portion 11 thus releasing the indicator elements.

No damage will be incurred in the power train or by the elements of the present invention due to changes in the speed of either the clocked or clocking vehicle since the speedometer is not a direct drive device but is floating with its movement imparted by magnetic fields. These fields are not strong enough to cause damage to the parts when they are overcome.

It is obvious that the present invention has the advantage of allowing the speed of the clocking vehicle and the rate of closing of the electronic radar unit to be advantageously combined through a medium of mechanical means to give an accurate single indication of the ground speed of a clocked vehicle regardless of whether such vehicle is traveling in the same or the opposite direction from the clocking vehicle and regardless of whether the clocking vehicle is moving or not. Another advantage of the present invention is to provide an inexpensive remote speed indicator which is simple in construction and operation. Additionally, the present invention has the advantage of providing means for allowing a speedometer indicator card to be reversed through the use of a reversing speedometer element so that the ground speed of a clocked vehicle can be indicated in a single reading regardless of such vehicle's direction of travel.

The terms "upper," "lower," "right," "left" and so forth have been used herein merely for convenience in the foregoing specification to describe the remote speed indicator and its parts as oriented in the drawings. It is to be understood, however, that these terms are in no way limiting to the invention since the indicator may obviously be disposed in many different positions when it is in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. In a device for determining the ground speed of a clocked vehicle from a moving clocking vehicle, said clocking vehicle including an electronic speed differential computer having a rotatable shaft to indicate the results of operation and a speedometer cable rotatable in proportion to such vehicle's speed, the improvement comprising: means for selectively reversing the direction of rotation of said cable; speedometer means capable of reversible rotative operation operatively connected to said reversing means; a speed indicator card means operatively connected to said speedometer; and indicator means mounted to said computer shaft and operatively superimposed upon said speed indicator card whereby the speed differential between said vehicles computed by said computer may be interpreted relative to the speed of the clocking vehicle to give a single reading of the ground speed of the clocked vehicle regardless of its relative direction of speed.

2. The ground speed indicating device of claim 1 wherein the reversing means includes a pair of spaced gears disposed generally in the same plane and having identical diameters and number of teeth; one of said gears being connected to said cable and the other gear connected to said speedometer; a bar slideably mounted adjacent the space between said gears; a pair of meshed, identically sized and toothed reversing gears mounted on said bar; and a single reversing gear mounted on said bar in spaced relation to said pair of reversing gears so that when either of such spaced reversing gears is in engagement with said first mentioned pair of gears, the other will be disengaged whereby the moving of said bar longitudinally will cause said reversing gears to be selectively engaged to selectively change the direction of rotation of said speedometer relative to said cable.

3. The speed indicating device of claim 1 including means for selectively locking and unlocking said speed indicator card relative to said indicator means whereby accurate readings may be obtained of the clocked vehicle's ground speed.

4. The speed indicating device of claim 1 wherein the reversible speedometer means includes a rotatable magnet operatively connected to the reversing means; a circular speed cup rotatively mounted about and above said magnet; a circular housing mounted about and above said speed cup with an enlarged opening therebetween; a drive shaft fixedly secured to the center of said speed cup and projecting upwardly through said housing; a sleeve depending from said housing to a point adjacent said cup and sleeve disposed about said shaft; a pair of sleeves resistantly mounted on said depending sleeve; stop means upwardly projecting from a point near the periphery of said speed cup to a point adjacent said housing; a housing stop downwardly projecting from a point near the periphery of said housing to a point adjacent said speed cup; first hair spring means fixedly secured at one end to one of the resistantly mounted sleeves and coiling in a clockwise direction outwardly to terminate in a straightened portion adapted to tensioningly rest against said stops; a second hair spring having one end fixedly secured to the other resistantly mounted sleeve and coiled in a counterclockwise direction to terminate in a straightened portion adapted to tensioningly rest against said stops on their side opposite from said first mentioned hair spring whereby said speed cup may rotate in either direction while being at all times tensioned toward the housing stop by one of the hair springs.

5. The speed indicator means of claim 4 wherein means are provided for adjustably rotating the resistantly mounted sleeves whereby the tension of said hair springs against said stops may be adjusted.

6. A reversible speedometer means for use in conjunction with speed indicating devices comprising: a rotatable magnet operatively connected to the reversing means; a circular speed cup rotatively mounted about and above said magnet; a circular housing mounted about and above said speed cup with an enlarged opening therebetween; a drive shaft fixedly secured to the center of said speed cup and projecting upwardly through said housing; a sleeve depending from said housing to a point adjacent said cup and sleeve disposed about said shaft; a pair of sleeves resistantly mounted on said depending sleeve; stop means upwardly projecting from a point near the periphery of said speed cup to a point adjacent said housing; a housing stop downwardly projecting from a point near the periphery of said housing to a point adjacent said speed cup; first hair spring means fixedly secured at one end to one of the resistantly mounted sleeves, and coiling in a clockwise direction outwardly to terminate in a straightened portion adapted to tensioningly rest against said stops; a second hair spring having one end fixedly secured to the other resistantly mounted sleeve and coiled in a counterclockwise direction to terminate in a straightened portion adapted to tensioningly rest against said stops on their side opposite from said first mentioned hair spring whereby said speed cup may rotate in either direction while being at all times tensioned toward the housing stop by one of the hair springs.

References Cited
UNITED STATES PATENTS 2,059,118  10/1936  Kolf _____ 73—507
3,079,553  2/1963  Brown et al.

JAMES J. GILL, Primary Examiner

U.S. Cl. X.R.

73—510, 528